June 24, 1924.
R. P. M. DAVIS
1,498,614
AUTOMATIC MACHINE FOR MAKING BRICKS
Filed July 20, 1922    4 Sheets-Sheet 3
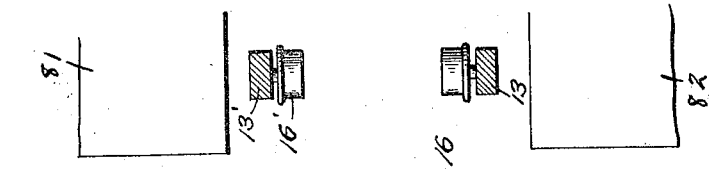
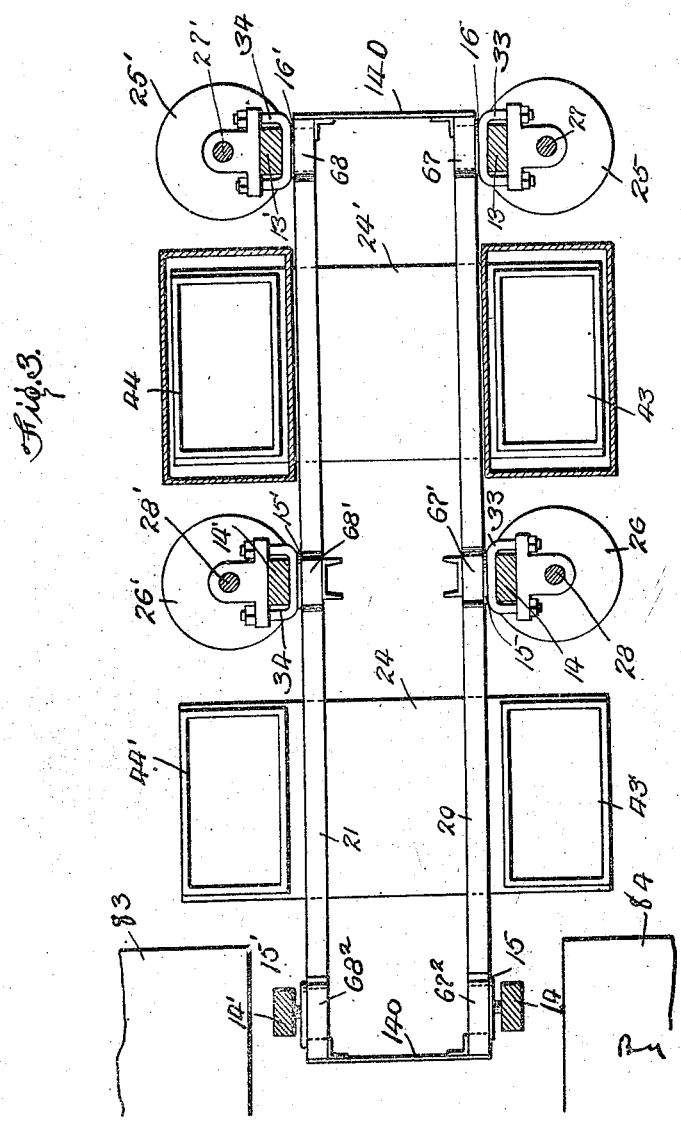

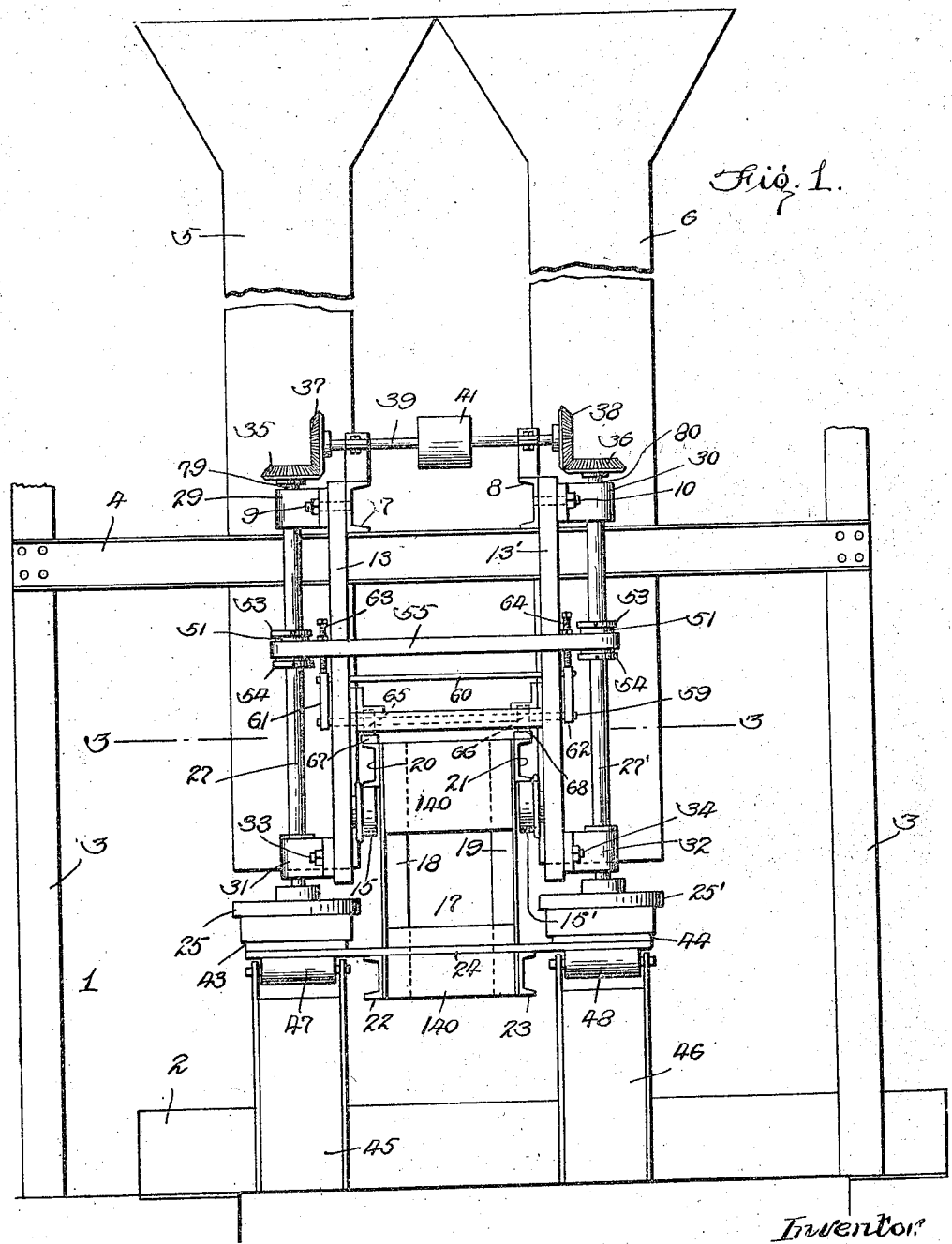

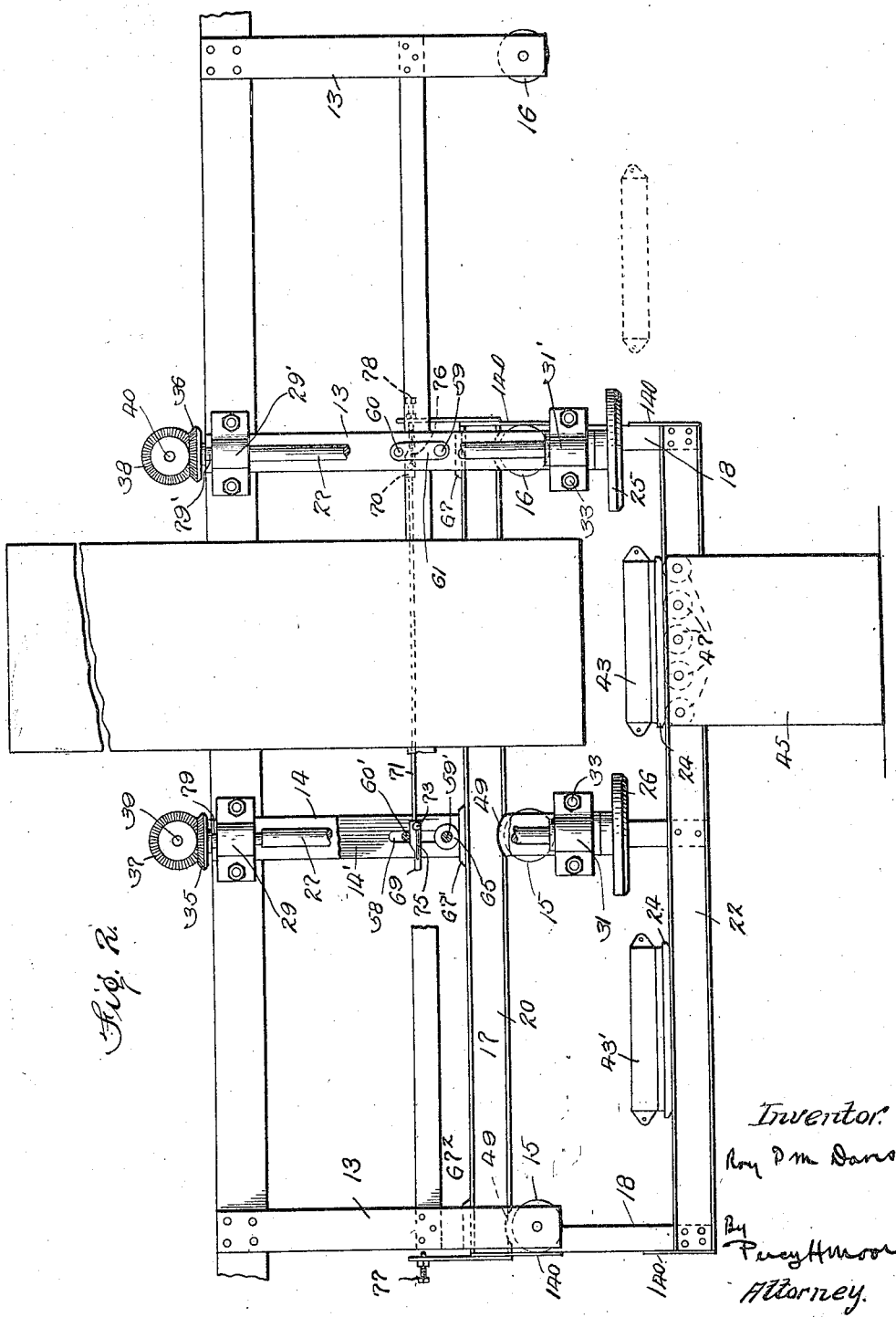

June 24, 1924.
R. P. M. DAVIS
1,498,614
AUTOMATIC MACHINE FOR MAKING BRICKS
Filed July 20, 1922
4 Sheets-Sheet 4
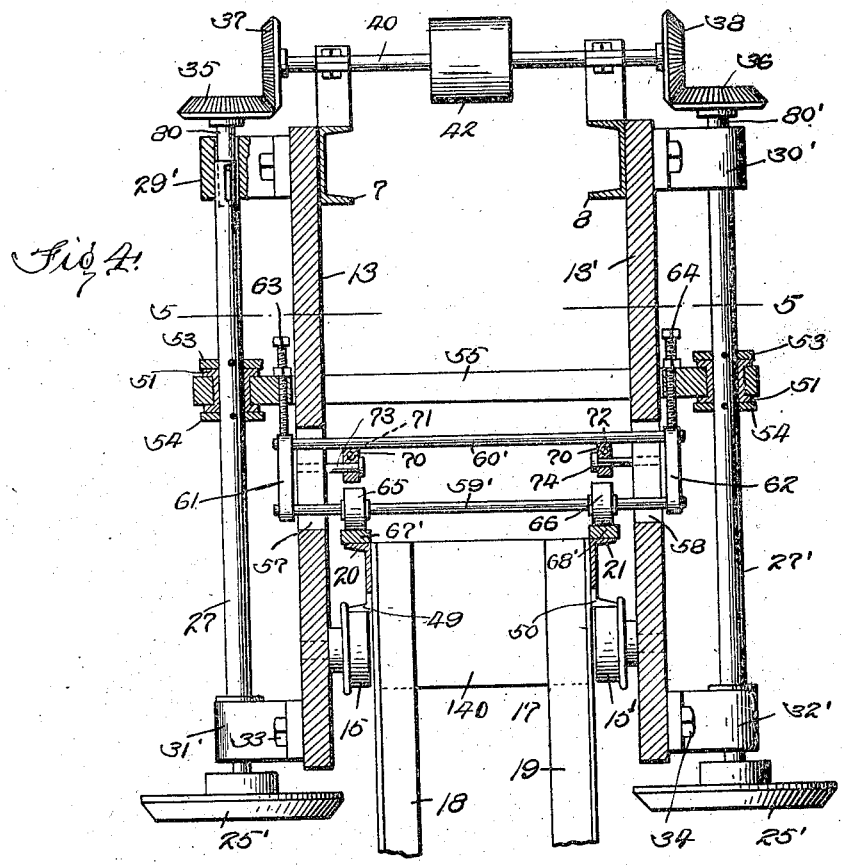

Patented June 24, 1924.

1,498,614

UNITED STATES PATENT OFFICE.

ROY P. M. DAVIS, OF MOUNT UNION, PENNSYLVANIA.

AUTOMATIC MACHINE FOR MAKING BRICKS.

Application filed July 20, 1922. Serial No. 576,298.

*To all whom it may concern:*

Be it known that ROY P. M. DAVIS, a citizen of the United States of America, residing at Mount Union, in the county of Huntingdon and State of Pennsylvania, has invented certain new and useful Improvements in Automatic Machines for Making Bricks, of which the following is a specification.

My invention relates to automatic machines for making bricks and other molded articles.

The object of my invention is to provide a continuously operable machine which will lessen the labor incident to making brick by hand, thereby cutting down expense and greatly increasing the production of the brick making plant.

Another object of my invention is to provide means for relieving the molds, mold tables and tracks therefor of the great strain incident to feeding the mud to the molds by gravity.

Another object of my invention is to provide automatic means for moving the rotary slickers to inoperative position to prevent damage to the molds and slickers when the empty molds are passing beneath the slickers.

Other and further objects and advantages of my invention will be in part obvious and in part described as the specification is proceeded with.

In the accompanying drawings forming part of this specification:

Figure 1 is an end elevation of the invention;

Figure 2 is a wide elevation partly broken away and partly in section;

Figure 3 is a section on line 3—3 of Figure 1;

Figure 4 is an enlarged detail section showing the mechanism for raising and lowering the slicker shafts; and Figure 5 is a section on line 5—5 of Figure 4.

Referring more particularly to the drawings wherein like reference characters indicate corresponding parts throughout the several views, 1 denotes a frame comprising uprights or beams 3 and transverse beams 4 of any suitable shape such as I or U beams supported upon a base 2.

The material from which the bricks are made, such as silica rock is fed by gravity from any suitable source of supply (not shown) into a pair of spaced hoppers 5 and 6 in turn supported on the frame 1 by means of longitudinally disposed channel beams 7 and 8 which rest upon the transverse beams 4 between the hoppers. It will be understood that the beam 7 supports the hopper 5 and that the beam 8 supports the hopper 6, bolts 9 and 10 being employed to secure these respective parts together.

Depending from the U-beams 7 and 8 respectively and bolted thereto as by the bolts 9 and 10 previously mentioned are two pair of arms 13—13' and 14—14' which carry rollers 15—15' and 16—16', the purpose of which will be presently described.

Mounted for reciprocatory movement between the hoppers 5 and 6 is a carriage 17 of angle iron skeleton construction comprising upright end posts or beams 18 and 19 and horizontally disposed upper side beams 20 and 21 and lower beams 22 and 23. Top and bottom end plates 140 connect and brace the end uprights. The upper side beams 20 and 21 rest upon the rollers 15—15' and 16—16', and serve as tracks for the carriage 17 which is propelled to and fro between the hoppers by any suitable mechanism (not shown). Resting upon the lower beams 22 and 23 are two mold supporting plates 24 and 24' the ends of which project laterally as best illustrated in Figure 1, to bring them in line with the discharge end of the hoppers or chutes 5 and 6 during the travel of the carriage 17.

Arranged at each side of the hoppers or conveyor chutes 5 and 6 and in horizontal alignment therewith are rotary slickers 25—25' and 26—26', fixed to the lower ends of the respective slicker shafts 27—27' and 28—28', in turn journaled in and capable of slight vertical movement in upper bearings 29—29' and 30—30', and lower bearings 31—31' and 32—32'. The bearings 29—29' and 30—30' are bolted to the U-beams 7 and 8 and to the upper ends of the arms 13—13' and 14—14' by bolts 11 and 12 previously referred to, while the bearings 31—31' and 32—32' are bolted to the lower end of these arms 13—13' and 14—14' by means of bolts 33 and 34.

Mounted in the upper bearings 29—29' and 30—30' are short shafts 79—79' and 80—80' which telescope within the upper end of the slicker shafts but keyed for rotation therewith. These short shafts are provided with gears 35 and 36 meshing with gears 37 and 38 on drive shafts 39 and 40, in turn driven by pulleys 41 and 42 connected with any suitable source of power (not shown). It will thus be seen that the slicker shafts are free to move up and down in their bearings without moving the gears out of mesh.

Two pair of molds 43—43' and 44—44' which are positioned upon the projecting ends of the plates 24—24' are filled with silicate ore or other suitable material for making bricks as the molds pass beneath the hoppers 5 and 6. Any suitable means (not shown) may be employed for automatically feeding a charge to the molds as the latter reach aligned position beneath the hoppers. As the shock of the descending charge is very great, some means must be provided for relieving the frame 1, tracks 20 and 21 and carriage 17 of the stresses incident to the dropping of the mud. This I accomplish by providing anvils or pedestals 45 and 46 provided with rollers 47 and 48 at their upper ends arranged beneath the hoppers 5 and 6 respectively, but spaced therefrom. The rails 20 and 21 are notched or recessed at predetermined points along their lower edges as at 49 and 50, so that the carriages will drop sufficiently to permit the projecting ends of the tables 24—24' to frictionally engage the rollers 47 and 48 as the ends of the tables pass beneath the hoppers during the travel of the carriages 17 to and fro on the wheels 15—15' and 16—16'. Consequently when the charge descends from the hoppers 5 and 6 into the molds 43—43' and 44—44' the shock will be borne by the posts or pedestals, thus relieving the carriage and carriage supporting parts from undue strain.

As previously stated the slicker shafts are mounted for rotary as well as vertical movement in the bearings 29—29' and 30—30'. The purpose of mounting the slicker shafts for vertical adjustment is to permit the slickers 25—25' and 26—26' being elevated as the empty molds pass therebeneath, thereby preventing damage to either or both slickers and molds by grinding contact between these members. This is accomplished as follows:

The slicker shafts are provided respectively with bushings 51 confined upon their respective shafts by means of upper and lower collars 53 and 54. These bushings in turn support bars 55 apertured at their ends for receiving the said bushing, and also slotted intermediate their ends to permit of the arms 13 and 14 passing therethrough, as best illustrated in Figures 4 and 5.

The arms 13—13' and 14—14' previously referred to as being suspended from the longitudinally disposed channel beams 7 and 8 of the frame 1, are provided with slots or openings 57 and 58 respectively, through which extend the opposite ends of vertically spaced rods 59—59' and 60—60' connected at their ends by links 61 and 62. These links 61 and 62 are in turn supported by set screws 63 and 64 threadedly mounted in the bars 55. It will thus be seen that the rods 59 and 60 and consequently the slickers may be adjusted in a vertical direction by means of the set screws, in order to accommodate molds of different thicknesses.

Mounted on the rods 59—59' adjacent the ends thereof are rollers 65 and 66 in the path of travel of the cam projections 67—68, 67'—68' and 67²—68² fixed to the upper face or edge of the upper side beams or tracks 20 and 21 of the carriage 17. These cam projections which are positioned directly above the notched portions 49 and 50 of the tracks engage the rollers 65 and 66 thus raising the slicker shafts at predetermined points in the travel of the carriage. It will thus be seen that the slickers will rise and fall by virtue of the action of the cam projections as the carriage 17 makes a trip in either direction, but in order to prevent contact between the slickers and the empty molds cams 69 and 70 are provided for engagement beneath the rods 60 at predetermined intervals.

The cams 69 and 70 which are fixedly mounted on opposite ends of longitudinally disposed rods 71 and 72 are in turn supported by pins 73 and 74 projecting inwardly from the arms 13 and 14 respectively. These pins 73 and 74 extend through slots 75 and 76 on the cams 69 and 70 and limit the movement of the latter, when engaged by the screws 77 and 78 mounted on opposite ends of the carriage 17.

From the foregoing it is thought that the operation of the machine will be clear but the same will be briefly explained as follows:

Assuming that the carriage 17 has been propelled to the left as far as it will go (Figure 2 position) by any suitable source of power (not shown) the first pair of molds 43'—44' will have passed beneath the slickers and are ready for removal. The hoppers 5 and 6 will at this time be caused to discharge a load of mud into the second pair of molds 43—44 whereupon the carriage which has been momentarily halted by any suitable switch or control mechanism (also not shown) will then be caused to move in an opposite direction or to the right, thereby carrying the second pair of molds which have just been filled beneath, the first pair of slickers at which point the carriage is again halted as before, and then proceeds to the right until the molds 43'—44' have moved into alinement with the hoppers. The carriage will move on after a pause sufficient to permit of the first pair of molds 43'—44' being filled and the bricks in the second pair 43—44 being slicked. When the molds 43—43' reach the tables 83—84, two men at each end (off bearers) dump the bricks on the tables and return the molds. This cycle of operation is duplicated on the return movement of the carriage, tables 81—82 being provided at the opposite or left end of the machine upon which the bricks are deposited in the manner just described. It will of course, be understood that the tables 24 will be lowered into contact with the pedestals 45 and 46 coincident with the discharge of mud into the molds, by virtue of the notches 49 and 50 in the carriage rails coming into register with the rollers 15—15' and 16—16'.

During the operation just described and just previous to the completion of the movement of the carriage to the left, screws 78 have pushed cams 70 from under latch rods 60 but the slicker shafts controlled thereby are still held in elevated position by means of cams 67—68' which have previously been moved to a position beneath the rollers 65 and 66. The cams 69 are now beneath the latch rod 60', holding the same in elevated position. As the carriage now moves to the right, the corresponding slicker will drop when cams 67—68 slide from under rollers 65—66. By this time the molds 43—44 have arrived under the slickers 25—25', molds 43'—44' having been moved beneath slickers 26—26' which are held out of contact with the empty molds by means of cams 69—69'. At the completion of the movement of the carriage to the right screws 77 will push cams 69—69' and 70—70', thereby reversing the action of the slickers for the return stroke of the carriage to the left.

What I claim is:

1. A machine for making brick comprising a frame, a carriage mounted for travel to and fro upon said frame, a table on said carriage having laterally projecting ends adapted to carry molds, and alternately arranged slickers and discharge hoppers in the path of said table ends for successively depositing mud into said molds and slicking the brick formed therein.

2. A machine for making brick comprising a frame, a carriage mounted for travel to and fro on said frame, tables mounted on said carriage adapted to support the brick molds, means for depositing a charge of material into the molds, and means arranged adjacent to but disconnected from the frame for relieving the frame of the shock incident to the depositing of said charge into said molds.

3. A machine for making brick comprising a frame, a carriage mounted for travel to and fro upon said frame, a table on said carriage having laterally projecting ends adapted to carry molds, discharge hoppers in the path of said table ends for depositing mud into said molds, and means for engaging beneath the table ends for relieving the frame of the shock incident to the depositing of said charge into said molds.

4. A machine for making brick comprising a frame, wheels supported in said frame, a carriage having tracks resting on said wheels for travel thereon, a mold support on said carriage, a removable mold on said support, a pedestal arranged alongside said carriage in the path of said mold support, means for depositing a charge of material into said mold, said tracks being recessed to permit said mold support to drop into contact with said pedestal when said charge is received by the mold.

5. A machine for making brick comprising a frame, a carriage mounted for travel on said frame, a mold support having its ends projecting through opposite sides of said frame, molds on the said ends, and hoppers arranged on each side of said frame in the path of the projecting ends of said support.

6. A machine for making bricks comprising a frame, a carriage mounted for travel on said frame, means on said carriage for supporting a mold, a slicker shaft and slicker arranged in the path of the mold, means for elevating the slicker shaft to inoperative position and a latch mechanism for temporarily maintaining said shaft in elevated position.

In testimony whereof I affix my signature in presence of two witnesses.

ROY P. M. DAVIS.

Witnesses:
T. L. ARCHEY,
V. L. WOLLETT.